United States Patent [19]
Hong

[11] Patent Number: 5,957,587
[45] Date of Patent: Sep. 28, 1999

[54] AIR DYNAMIC BEARING

[75] Inventor: Min-pyo Hong, Suwon, Rep. of Korea

[73] Assignee: Samsung Electronics Co., Ltd., Kyungki, Rep. of Korea

[21] Appl. No.: 08/887,896

[22] Filed: Jul. 3, 1997

[30] Foreign Application Priority Data

Jul. 15, 1996 [KR] Rep. of Korea ................. 96-20947

[51] Int. Cl.⁶ ............................................. F16C 32/06
[52] U.S. Cl. ................................... 384/108; 384/119
[58] Field of Search .......................... 384/100, 108, 384/114, 119, 131, 132, 135, 109

[56] References Cited

U.S. PATENT DOCUMENTS

| | | | |
|---|---|---|---|
| 3,265,452 | 8/1966 | Pan et al. ........................ | 384/109 |
| 4,696,584 | 9/1987 | Tielemans ....................... | 384/107 |
| 4,925,321 | 5/1990 | Maruyama et al. ............. | 384/114 |
| 5,018,880 | 5/1991 | Nakasugi et al. ............... | 384/107 X |
| 5,631,761 | 5/1997 | Lee .................................. | 384/100 X |
| 5,709,480 | 1/1998 | Hong .............................. | 384/108 X |

*Primary Examiner*—Thomas R. Hannon
*Attorney, Agent, or Firm*—Sughrue, Mion, Zinn, Macpeak & Seas, PLLC

[57] ABSTRACT

An air dynamic bearing is constructed to prevent the inflow of a foreign substance. The air dynamic bearing includes an inner member having a lubricious surface and fixed to a shaft which rotates, and an outer member having a lubricious surface corresponding to the lubricious surface of the inner member and supporting the inner member to be operative to rotate. First grooves are formed in the lubricious surface of at least one of the inner and the outer members to generate a predetermined air pressure outward when the at least one of the inner and the outer members rotates.

13 Claims, 5 Drawing Sheets

AIR DYNAMIC BEARING

BACKGROUND OF THE INVENTION

The present invention relates to an air dynamic bearing and, more particularly, to an air dynamic bearing constructed to prevent the inflow of a foreign substance.

An air dynamic bearing may be a hemispheric air dynamic bearing, a journal air dynamic bearing, or a thrust air dynamic bearing. The air dynamic bearing is used for a motor for driving a disk of a hard disk drive, a motor for driving a rotary polygon mirror of a laser printer or a laser scanner, or a motor for driving a head drum of a digital VCR which revolves at high speed.

In FIG. 1, a conventional hemispheric air dynamic bearing is illustrated. Referring to the drawing, the hemispheric air dynamic bearing includes an upper hemisphere 2 and a lower hemisphere 3, having their curved surfaces facing each other, which are fixed to a shaft 1, a bush 4 having hemispheric cavities 4a and 4b with which the upper hemisphere 2 and the lower hemisphere 3 are rotatably combined, a coupling ring 5 which confines the upper hemisphere 2 and the lower hemisphere 3 to the shaft 1, and a spacer 6 combined with the shaft 1, between the upper hemisphere 2 and the lower hemisphere 3, to maintain a clearance between the upper and lower hemispheres 2 and 3 and the bush 4.

The curved surfaces of the upper and lower hemispheres 2 and 3, and the surfaces of the bush 4 which face them, are lubricious and have grooves 7 formed in them. An appropriate clearance is maintained between the upper and lower hemispheres 2 and 3 and the bush 4. When the upper hemisphere 2 and the lower hemisphere 3 are rotated relative to the bush 4, an air pressure is generated in the clearance. The air pressure prevents the upper and lower hemispheres 2 and 3 from contacting the bush 4 while rotating.

However, there may be an inflow of a foreign substance from the outside into the clearance between the upper and lower hemispheres 2 and 3 and the bush 4. The inflow of the foreign substance into the clearance causes damage to the lubricious surfaces or degrades the rotational properties of the bearing.

SUMMARY OF THE INVENTION

To overcome the above problems, it is an object of the present invention to provide an air dynamic bearing which prevents the inflow of a foreign substance from the outside into a clearance maintained therein.

Accordingly, to achieve the above object, there is provided an air dynamic bearing which includes an inner member having a lubricious surface and fixed to a shaft which rotates, and an outer member having a lubricious surface corresponding to the lubricious surface of the inner member and supporting the inner member to be operative to rotate, in which at least one first groove is formed in the lubricious surface of at least one of the inner and the outer members to generate a predetermined air pressure outward when the at least one of the inner and the outer members rotates.

In this case, the first groove is angled such that the inner end of each groove leads the outer end of the groove in a direction of rotation as the inner member rotates.

BRIEF DESCRIPTION OF THE DRAWINGS

The above object and advantages of the present invention will become more apparent by describing in detail preferred embodiments thereof with reference to the accompanying drawings, in which:

FIG. 4A is an enlarged portion of FIG. 4.

DETAILED DESCRIPTION OF THE PREFERRED EMBODIMENTS

Figure 1:
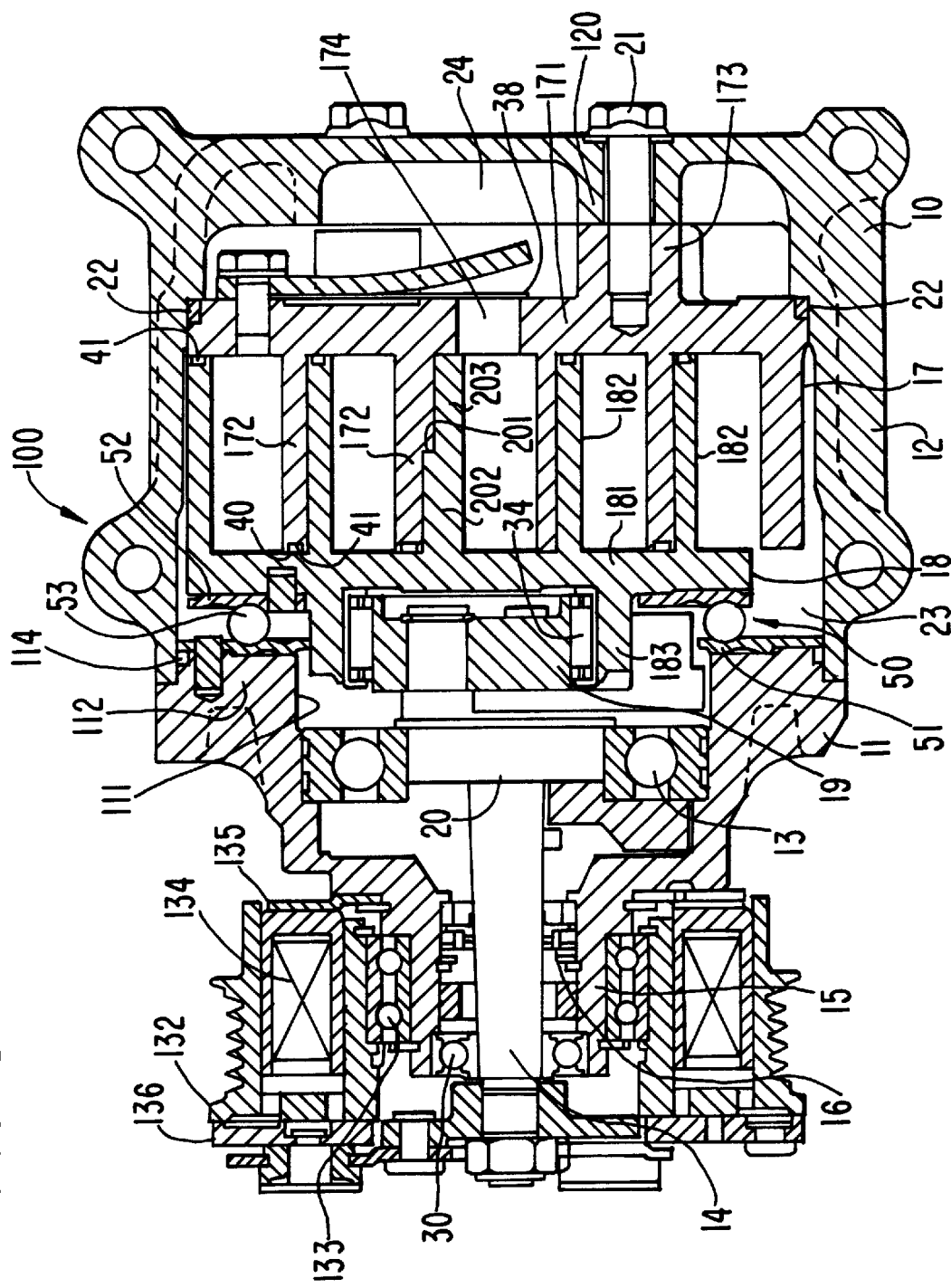
FIG. 1 is a cutaway sectional view illustrating a conventional air dynamic bearing.
Figure 2:
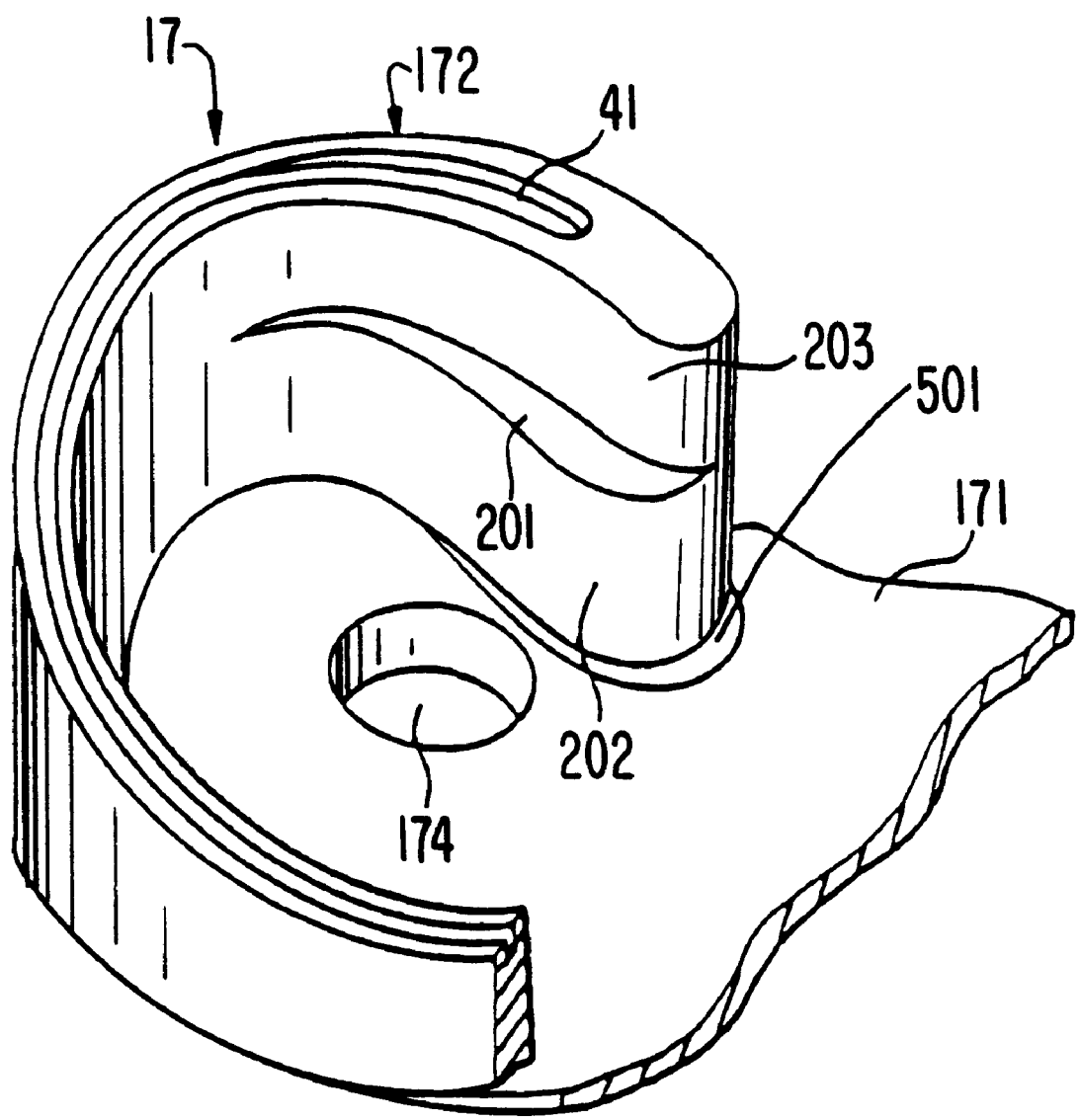
FIG. 2 is a cutaway sectional view illustrating an air dynamic bearing according to an embodiment of the present invention.

Referring to FIG. 2, a hemispheric air dynamic bearing according to the present invention includes an inner member, such as upper and lower hemispheres 20 and 30, having their curved surfaces facing each other, fixed to a shaft 10, an outer member such as a bush 40 having hemispheric cavities 40a and 40b formed in the upper and lower portions thereof with which the upper hemisphere 20 and the lower hemisphere 30, respectively, are rotatably combined, a coupling ring 50 which confines the upper hemisphere 20 and the lower hemisphere 30 to the shaft 10, and a spacer 60 combined with the shaft 10 between the upper hemisphere 20 and the lower hemisphere 30 to maintain a clearance between the upper and lower hemispheres 20 and 30 and the bush 40.

It is a characteristic feature of the present invention that first grooves 80 for preventing an inflow of a foreign substance are formed at the outer edge portion of the lubricious surfaces of the upper and lower hemispheres 20 and 30 facing the bush 40 of the hemispheric air dynamic bearing. Alternatively, the first grooves 80 can be formed on a lubricious surface of the bush 40 facing the upper and lower hemispheres 20 and 30.

The first grooves 80 are at a predetermined angle with respect to the rotational direction of the bush 40 such that a predetermined air pressure is generated outward when the upper and lower hemispheres 20 and 30 rotate relative to the bush 40. It is preferable that the first grooves 80 are formed such that the inner end of each groove leads the outer end of the groove as the grooved member rotates in the direction indicated by an arrow A.

Also, the first grooves 80 formed at a predetermined angle can prevent the inflow of a foreign substance. Although the foreign substance may enter while, for example, the shaft is at rest, the foreign substance is expelled outward through the first grooves 80 by a centrifugal force due to the weight thereof.

Figure 4:
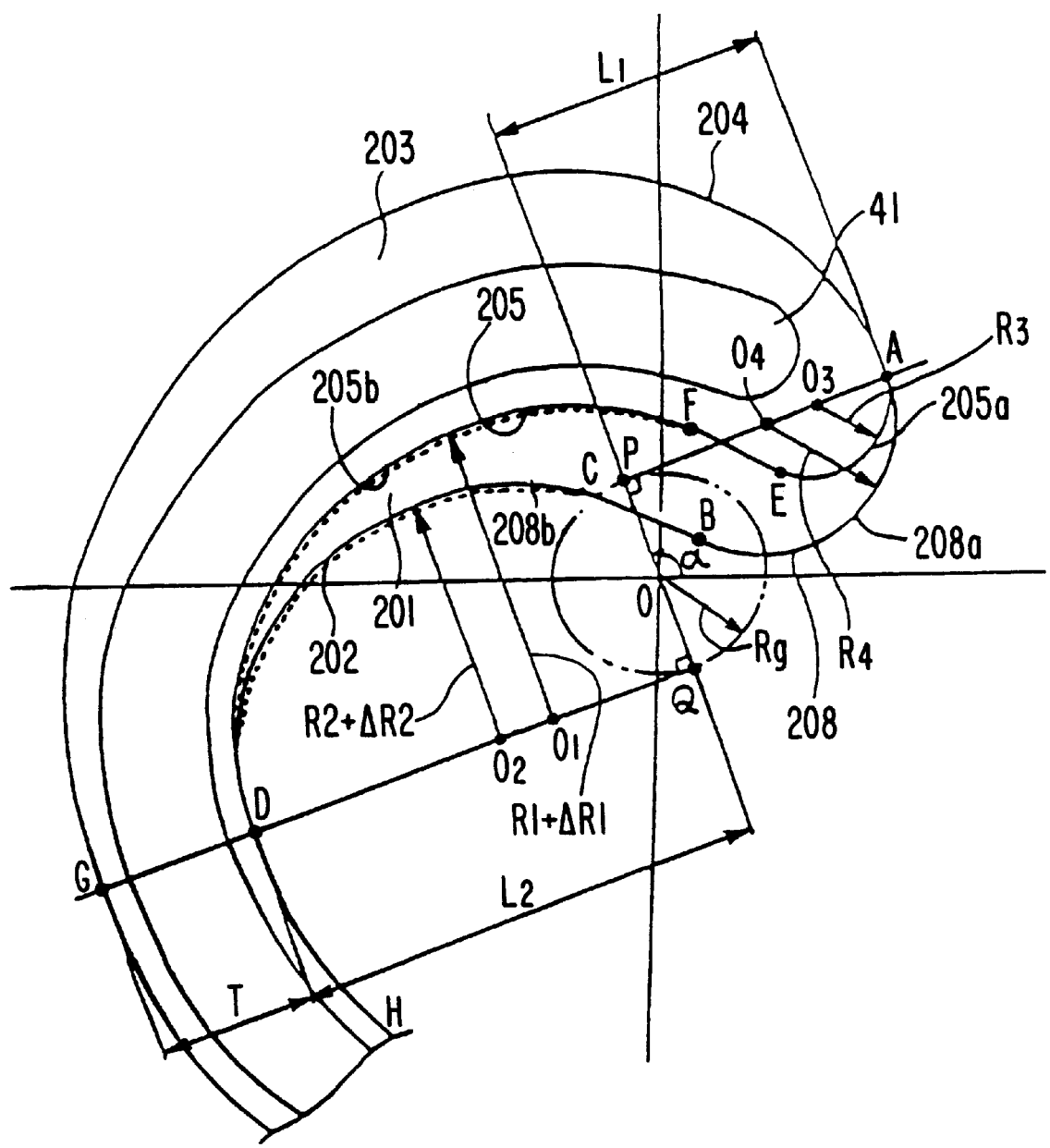
FIG. 4 is a cross sectional view taken along line IV—IV of FIG. 2.
Figure 5:
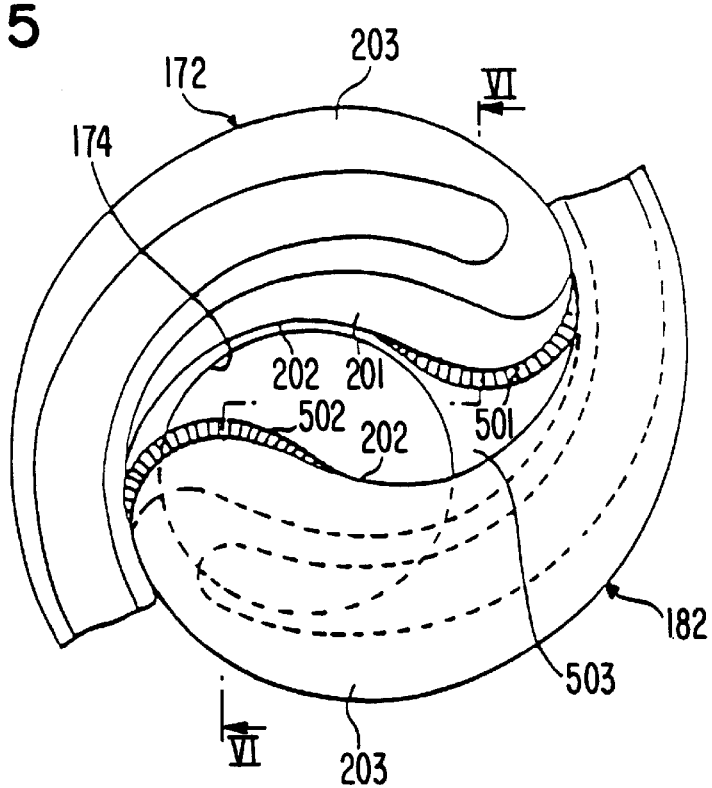
Figure 6:
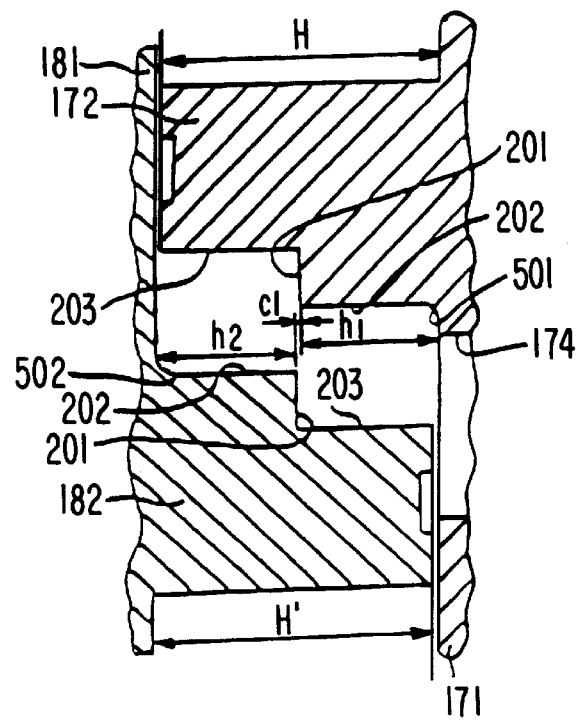

The upper and lower hemispheres 20 and 30 and the bush 40 are manufactured using high carbon steel or tungsten-cobalt (WCo) as a main constituent. The surfaces of the upper and lower hemispheres 20 and 30 are coated with a titanium (Ti) film 21 having a thickness between 5 $\mu$m–20 $\mu$m, as shown in FIG. 4. Likewise, the lubricious surface of the hemispheric cavities 40a and 40b of the bush 40 can be coated with a titanium (Ti) film 41 having a thickness between 5 $\mu$m–20 $\mu$m.

Alternatively, the upper and lower hemispheres 20 and 30 and the bush 40 can be formed of ceramic. In this case, a $Al_2O_3$ coating film can be formed instead of the titanium film.

Also, to reduce abrasion due to friction between the upper and lower hemispheres 20 and 30 and the bush 40 and to generate a predetermined air pressure, DLC (diamond like carbon) films 22 and 42 having a thickness between 0.05–10 $\mu$m can be coated on the titanium coating films 21 and 41 or the Al$_2$O$_3$ coating film (not shown) coated on the upper and lower hemispheres 20 and 30 and the bush 40, respectively.

Since the DLC coating films 22 and 42 have a coefficient of linear expansion similar to that of the titanium coating films 21 and 41, flaking or changes in clearance do not occur. Also, the DLC coating films 22 and 42 resist abrasion better than the titanium coating film.

Figure 3:
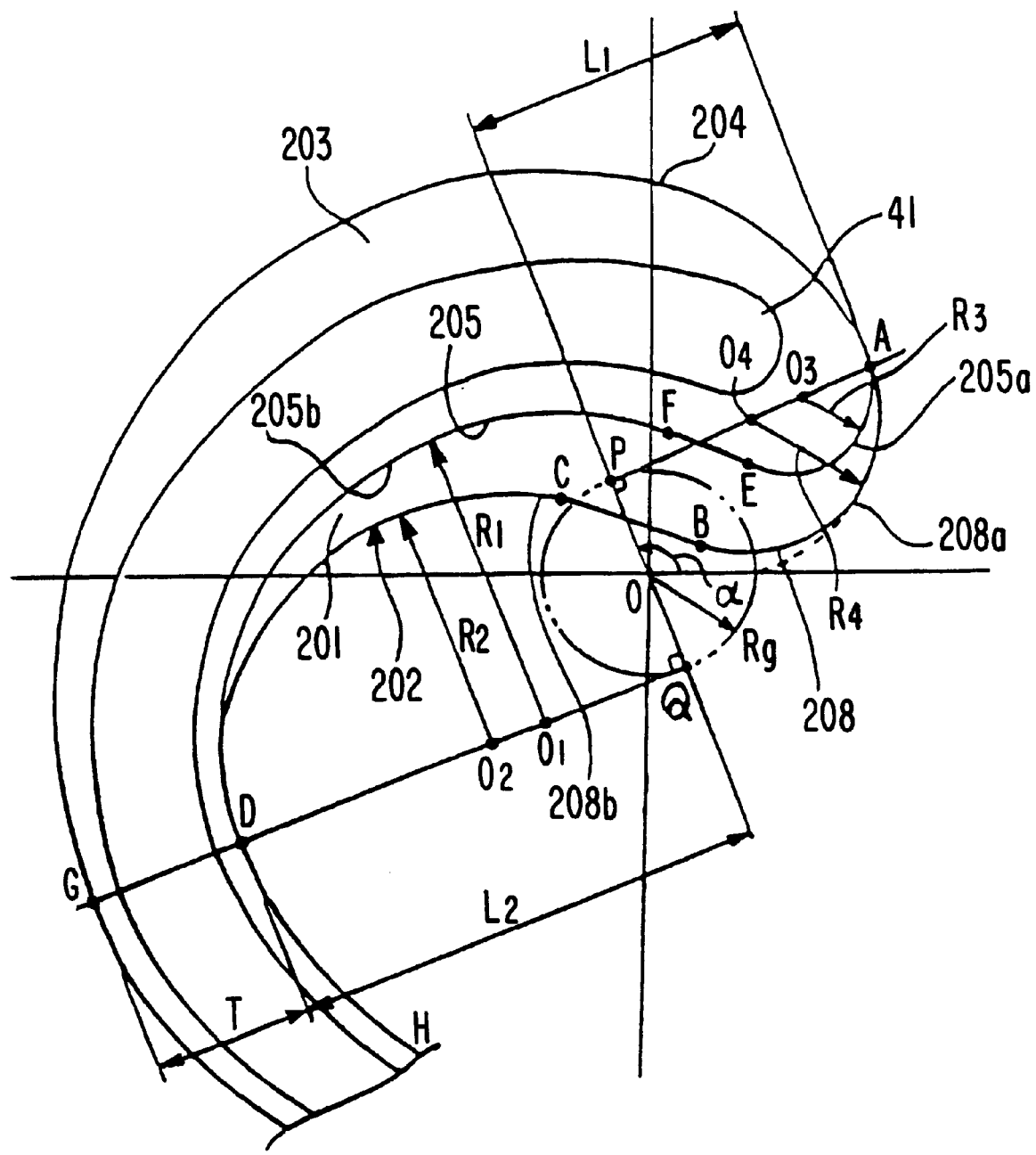
FIG. 3 is a cutaway sectional view illustrating an air dynamic bearing according to another embodiment of the present invention.

FIG. 3 illustrates another embodiment of the present invention. In this embodiment, the same reference numerals indicate the same members as shown in FIG. 2. Referring to FIG. 3, second grooves 90 can be formed along with the first grooves 80 on each lubricious surface of the bush 40 and the hemispheres 20 and 30. Preferably, the second grooves 90 are angled in the opposite direction to the first grooves 80.

An appropriate clearance is maintained between the hemispheres 20 and 30 and the bush 40. Accordingly, the bush 40 and the hemispheres 20 and 30 do not contact each other, while rotating, due to air pressure generated from the clearance.

The shapes, depths and numbers of the first and second grooves 80 and 90 are appropriately set considering speed of rotation and capacity of load due to the generation of air pressure of the hemispheric air dynamic bearing.

The titanium coating film 21 and 41 or the DLC coating film 22 and 42, as described with reference to FIG. 4, can be formed on the lubricious surfaces of the upper and lower hemispheres 20 and 30 and of the bush 40 of this embodiment.

As described above, in the hemispheric air dynamic bearing according to the present invention, a foreign substance does not remain in the clearance. That is, the inflow of the foreign substance into the first groove 80 can be prevented, and if it does occur, the foreign substance is expelled outward through the first groove 80 by a centrifugal force due to the weight thereof.

It is noted that the present invention is not limited to the preferred embodiment described above, and it is apparent that variations and modifications by those skilled in the art can be effected within the spirit and scope of the present invention defined in the appended claims.

What is claimed is:

1. An air dynamic bearing comprising:
   an inner member having a lubricious surface and fixed to a shaft which rotates; and
   an outer member having a lubricious surface corresponding to the lubricious surface of said inner member and supporting said inner member to be operative to rotate, wherein at least one first groove is formed in the lubricious surface of at least one of said inner and said outer members, said first groove being formed at an angle with respect to the rotational direction of said inner member, said first groove including an inner end and an outer end and being angled such that the inner end of said first groove leads the outer end of the first groove in the rotational direction while said inner member is rotating, thereby to generate a predetermined air pressure outward when the at least one of said inner and said outer members rotates.

2. The air dynamic bearing as claimed in claim 1, wherein said inner member comprises a pair of hemispheres having their curved surfaces facing each other, fixed to said shaft, and said outer member comprises a bush having hemispheric cavities formed in upper and lower portions of said outer member with which said pair of hemispheres is combined to be operative to rotate.

3. The air dynamic bearing as claimed in claim 2, further comprising an Al$_3$O$_3$ film which is coated on the lubricious surface of at least one of said inner and said outer members.

4. The air dynamic bearing as claimed in claim 3, further comprising a diamond like carbon (DLC) film which is further coated on said Al$_2$O$_3$ film.

5. The air dynamic bearing as claimed in claim 1, further comprising at least one second groove, which is formed angled in a direction opposite to that of said first groove, in the lubricious surface of at least one of said inner and outer members.

6. The air dynamic bearing as claimed in claim 5, wherein a plurality of first and second grooves are provided.

7. The air dynamic bearing as claimed in claim 1, further comprising a titanium film which is coated on the lubricious surface of at least one of said inner and said outer members.

8. The air dynamic bearing as claimed in claim 7, wherein said titanium film has a thickness of between 5 $\mu$m–20 $\mu$m.

9. The air dynamic bearing as claimed in claim 8, further comprising a diamond like carbon (DLC) film which is further coated on said titanium film.

10. The air dynamic bearing as claimed in claim 9, wherein said DLC film has a thickness of between 0.05 $\mu$m–10 $\mu$m.

11. The air dynamic bearing as claimed in claim 1, further comprising an Al$_3$O$_3$ film which is coated on the lubricious surface of at least one of said inner and said outer members.

12. The air dynamic bearing as claimed in claim 11, further comprising a diamond like carbon (DLC) film which is further coated on said Al$_2$O$_3$ film.

13. The air dynamic bearing as claimed in claim 1, wherein a plurality of first grooves are provided.

* * * * *